(12) United States Patent
Pellenc (10) Patent No.: US 10,655,644 B2
(45) Date of Patent: May 19, 2020

(54) PORTABLE ELECTRIC BLOWER WITH LOW REACTION TORQUE

(71) Applicant: PELLENC (Societe Anonyme), Pertuis (FR)

(72) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 249 days.

(21) Appl. No.: 15/762,330

(22) PCT Filed: Nov. 3, 2016

(86) PCT No.: PCT/FR2016/052842
§ 371 (c)(1),
(2) Date: Jun. 18, 2018

(87) PCT Pub. No.: WO2017/089671
PCT Pub. Date: Jun. 1, 2017

(65) Prior Publication Data
US 2018/0291930 A1  Oct. 11, 2018

(30) Foreign Application Priority Data

Nov. 25, 2015  (FR) .................................... 15 61341

(51) Int. Cl.
| | | |
|---|---|---|
| *F04D 29/70* | (2006.01) |
| *E01H 1/08* | (2006.01) |
| *A01G 20/47* | (2018.01) |
| *F04D 19/00* | (2006.01) |
| *F04D 25/06* | (2006.01) |
| *A47L 5/14* | (2006.01) |
| *A47L 5/24* | (2006.01) |
| *F04D 29/54* | (2006.01) |

(52) U.S. Cl.
CPC .......... *F04D 29/703* (2013.01); *A01G 20/47* (2018.02); *E01H 1/0809* (2013.01); *F04D 19/002* (2013.01); *F04D 25/0673* (2013.01); *F04D 29/542* (2013.01); *A47L 5/14* (2013.01); *A47L 5/24* (2013.01)

(58) Field of Classification Search
CPC .. F04D 29/703; F04D 29/542; F04D 25/0673; F04D 19/002; A01G 20/47; E01H 1/0809; A47L 5/14; A47L 5/24
USPC ................................................... 15/344, 405
See application file for complete search history.

(56) References Cited

U.S. PATENT DOCUMENTS

| | | | | |
|---|---|---|---|---|
| 8,918,956 | B2 * | 12/2014 | Pellenc .................. | A01G 20/47 15/405 |
| 9,970,445 | B2 * | 5/2018 | Kodato ..................... | A47L 5/14 |
| 10,232,502 | B2 * | 3/2019 | Bylund ..................... | A47L 5/14 |

(Continued)

*Primary Examiner* — David Redding
(74) *Attorney, Agent, or Firm* — Egbert Law Offices, PLLC (57) ABSTRACT

A portable blower has an axial fan blower, a handle that has a midpoint of equilibrium, a blowing outlet that is connected downstream of the axial fan, at least one suction nozzle that is connected upstream of the axial fan and has an air intake mouth. The air intake nozzle includes a network of directional channels for homogenizing a flow of intake air, the network of directional channels being formed in the vicinity of the air intake mouth. The blower is particularly useful in the field of portable electric blowers for the maintenance of public spaces.

18 Claims, 6 Drawing Sheets

(56) References Cited

U.S. PATENT DOCUMENTS

2016/0208822 A1\* 7/2016 Barth .................... E01H 1/0809
2017/0042096 A1\* 2/2017 Bylund .................. A01G 20/43

\* cited by examiner

PORTABLE ELECTRIC BLOWER WITH LOW REACTION TORQUE

TECHNICAL FIELD

The present invention concerns a blower and in particular a portable electric blower with low reaction torque.

A blower means an air projection device used for sweeping away dry leaves or debris likely to be scattered about the surfaces of lawns, playgrounds, parking lots or public roadways.

Such a device is used primarily for pushing dry leaves or debris into piles that can then more easily be gathered up and removed. Use of a blower may replace a rake or broom. However, it provides greater efficiency while being less laborious.

The invention finds applications for blowers with thermal engines or with electric motors. It is particularly intended for portable, cordless and lightweight blowers that can be carried and operated with one hand.

Portable electric blowers of this type may preferably be equipped with a power supply provided by an integrated or remote battery. A remote battery can be worn on the back or at the belt and be connected to the blower by a power cord.

STATE OF PRIOR ART

The document U.S. Pat. No. 8,894,382 describes a known portable electric blower of the integrated battery type.

Such a blower includes an axial blower fan seated in a casing and used for accelerating an air flow. The air is sucked in by a suction nozzle connected upstream of the fan and blown out by a blowing outlet connected downstream of the fan. The fan and the blowing outlet are capable of conferring high speed and homogenous direction to the exiting air flow.

The direction of the exiting air flow is determined by the blowing outlet. This outlet is essentially aligned or the axis of the axial blower fan so as to optimize the blowing performance and to limit any load losses.

A carrying and operating handle of the blower is provided on the upper portion of the blower in its operating position. The handle is disposed so as to coincide with a point of equilibrium of the blower so that the masses of the blower are distributed in an essentially equal manner in front of and behind the handle. This measure prevents exerting on the operator's hand a significant torque in the forward or backward direction when carrying the blower while it is not working.

Incidentally, a certain inclination of the handle in relation to the fan axis allows for adjusting a comfortable position of the hand holding the handle when the blowing outlet presents a predetermined blowing angle relative to the ground.

In blowers of this type, the carrying and operating handle is located above the fan axis and at a certain distance from this axis. Now, when the blower is operating, the thrust power of the air flow exiting the blowing outlet generates a reaction torque in the axis of the thrust power but in the opposite direction of the latter. In the case of the document U.S. Pat. No. 8,894,382 these forces are also aligned on the fan axis. Thus, and because of the distance separating the handle from the fan axis, the force of reaction to the air blast creates a reaction torque on the handle and thus on the hand of the operator holding this handle.

To the force of reaction created by the exiting air flow is added a force of reaction to the entering air flow sucked up by the intake nozzle. Now, as the intake nozzle is generally aligned on the fan axis, the force of reaction to the exiting air flow is also oriented essentially along this axis and does further increase the torque being exerted on the operator's hand when the blower is in operation. In effect, relative to the air flow, the intake nozzle and the blowing nozzle are opposite in relation to the blowing fan. Thus under these conditions, the reaction forces are aligned and are added together due to the fact that the air movement is entering at the intake nozzle and exiting at the blowing outlet.

It is not possible to counterbalance the torque generated in reaction to the air flow of the blower simply through a different distribution of the blower masses or by relocating the handle relative to the point of equilibrium. In effect, the reaction force of the air flow which generates a torque at the handle is not constant when the blower is in operation. It may vary between a value of zero when the blower motor is stopped and a maximum value when the blower is operating at its full capacity. Now, it is not possible to correct dynamically the distribution of the masses or the positioning of the handle, depending on the reaction force of the air flow, to counterbalance the torque generated by this force.

Blowers of the type described generally present a switch or a trigger for actuating, in continuous or modulated fashion depending on the position of the trigger, the electric drive motor of the blowing fan. In this way the air flow speed can be varied continuously or in modulated fashion. The discontinuous operation or the speed variations either establish, cancel, or constantly modify, the torque generated in reaction to the air flow and exerted on the operator's hand.

Now, operation of the blower constantly requires precise directing and positioning the air flow of the blower, requiring the operator's hand to counterbalance all the stresses running counter to this orientation and this position. The torque exerted on the operator's hand thus leads to muscular fatigue while operating the blower. This is in addition to the fatigue caused by the weight of the blower and the recoil force caused by the air blast. It reduces the time and comfort of use of the blower.

It should be noted that the torque resulting from the force of reaction to the blowing action becomes significant for blowers with a thrust power above 10N.

The document FR2964987 also describes a portable electric blower and aims to reduce the discomfort of its operation. The blower of this document does not have an integrated battery but a remote battery which is carried on the operator's back and connected to the blower motor by a short power cable.

The blower of the document FR2964987 presents an air intake nozzle bent downward, relative to a blower operating position in which the handle is positioned above the blower. The nozzle thus presents an air intake mouth which directs the air with a non-zero angle relative to the axis of the fan and thus relative to the blowing outlet. This blower also presents a protective grid positioned at the intake mouth to avoid sucking in any foreign objects and to prevent a hand from passing through to the fan.

Because of the particular orientation of this intake mouth, the force of reaction to the entering air flow generates at the handle a torque which is in opposition to the torque of the blowing action caused by the exiting air blast and which thus partially counterbalances it. The effort the operator must make with his hand to counter the torque of the blowing action is thereby diminished.

Counterbalancing is generally partial. In effect, the forces of reaction to the intake air flow are weaker than the forces of reaction to the blowing air flow, mainly because of a slower air displacement speed at the intake than at the blowing end.

DISCLOSURE OF THE INVENTION

In the description below, the terms "front", "rear", "high", "low", "upper" and "lower" are to be understood as reference to an operating position of the blower. The terms "upstream" and "downstream" are in reference to the circulation of an air flow across the blower.

The purpose of the present invention is to propose a portable blower in which the stresses sustained by the operator's hand under the effect of the force of reaction to the blowing air flow are reduced.

One aim in particular is to minimize a torque from the front to the rear sustained by the operator's hand grasping the handle of the blower when the blower is operating.

Another aim of the invention is to reduce the air noise of the blower.

Finally, one aim of the invention is to propose a blower that is lightweight and balanced and which reduces the user's fatigue and increases the ease of operation.

To achieve these aims the invention proposes r are specifically a portable blower which includes:

An axial blower fan presenting a fan axis,
A handle presenting a midpoint of equilibrium,
A blowing outlet connected downstream of the axial fan,
At least one intake nozzle connected upstream of the axial fan, the intake nozzle including an air intake mouth with an intake axis forming a non-zero angle with the fan axis, the intake mouth being situated upstream of a first plane perpendicular to the fan axis and including the midpoint of the handle, and the intake mouth being furthermore turned away from a second plane passing through the midpoint of the handle, the second plane being perpendicular to a straight line orthogonal to the fan axis and passing through the midpoint of the handle, and
a protective grid of the air intake mouth.
In accordance with the invention:
The air intake nozzle includes a lattice of directional channels for homogenizing an intake air flow, the directional channel lattice being positioned in the vicinity of the intake mouth
The lattice of directional channels presents a lattice axis, and the lattice axis presents a point of intersection with the second plane, the point of intersection being situated upstream of the first plane
The lattice of directional channels is configured so as to confer to the intake air flow a directional component opposite to the fan.

The lattice of directional channels exerts its influence ern the intake air flow in the direct vicinity of the air intake mouth.

One considers that the lattice of directional channels confers to the r flow a directional component opposite to the fan when it is possible to make it run counter to the trajectory of the entering air flow by modifying its orientation or its inclination. The configuration of the lattice of directional channels is in particular able to run counter to the air passage in a proximal portion of the intake mouth, the closest to the fan, where the air intake by the fan is naturally the strongest, and to promote the air flow in a distal portion of the intake mouth, the farthest away from the fan, where the air intake by the fan is naturally the least intensive. The dissymmetry in the action of the lattice of channels between the proximal portion and the distal portion provides the entering air flow with a directional component which is turned towards the opposite of the fan along its axis.

The lattice of directional channels can act through an inclination of the channels or through a dimensional non-uniformity which favors the passage of air at a greater distance from the fan. An inclination of the channels towards the rear allows thwarting the air passage in the proximal portion by artificially increasing the length of the trajectory. In a comparable manner, a gradient of length or of section of the channels allows thwarting the passage of air in the proximal portion by acting there like a supplementary load and to promote the passage of air in the distal portion.

These aspects are described in more detail in the text below.

The blower handle is used both for carrying the blower and for operating it, and in particular for directing it in a precise and controlled manner towards the dry leaves and debris to be removed. The handle is preferably designed for single-hand use.

The handle is positioned in the upper part of the blower in a carrying position of the blower while it is not in operation. The handle is preferably inclined so that the blowing outlet is directed in a preferably predetermined direction when the operator is holding the handle. Incidentally, the handle is preferably located essentially vertical to the center of gravity of the blower masses or at least of the blower part supported by the handle, so that the masses are distributed in an essentially even manner in front of and behind the handle. The result of this measure is the definition of a midpoint of equilibrium on the handle. Preferably, the midpoint of equilibrium is essentially in the middle of the handle taken in its axis. When the handle contains a trigger that is actuated by the index finger, the midpoint of equilibrium is preferably located slightly behind the trigger, in the vicinity of the middle finger of the operator's hand grasping the handle.

The fan axis is understood to be at the axis of rotation of the fan blades of the axial blower or at least the axis along which the blower fan directs the air flow at its exit. It corresponds to the direction of the air flow downstream from the blower fan and in close proximity to the fan. The intake axis is defined by a line perpendicular to a median plane along which the intake mouth extends and passes essentially through the middle of the intake mouth. A center plane is considered to the extent that the intake mouth is not necessarily plane in itself.

The axis of the lattice is understood to be a mean axis of all the channels while it is understood that all the channels are not necessarily parallel to each other. In effect, each channel may be oriented along its own axis. The lattice axis also passes through the middle of the intake mouth.

When the channels are all parallel to each other, the lattice axis is parallel to the axis of each channel. Incidentally, when the channels are all perpendicular to the mean plane of the intake mouth, the intake axis and the lattice axis are one and the same.

Orientation of the intake mouth away from the second plane means that this mouth is turned towards the ground, in a normal operating position of the blower. This measure, as well as the non-zero angle formed by the intake axis with the fan axis allows using the force of reaction to the entering air flow to counter at least a portion of the torque exerted by the blowing action at the midpoint of equilibrium of the handle.

The amount of counterbalance obtained depends on the force of reaction to the entering air flow and thus on the air speed at each channel, but also on the distance between the lattice axis and the midpoint of equilibrium of the handle, this distance having a leverage effect.

In the absence of channels, only the distance between the intake axis and the point of equilibrium of the handle has a leverage effect. In this case, an increase in the distance between the intake axis and the midpoint of equilibrium of the handle would a priori improve the counterbalance of the blowing action torque. However, increasing this distance would amount to increasing the length of the intake nozzle and thereby the size and weight of the blower.

The dispositions of the invention and in particular the lattice of directional channels also help improving the counterbalance of the torque of the blowing action without modifying the length of the nozzle.

The invention is based on an assessment that the speed of air entering through the intake mouth of a blower as described in the patent FR2964987 is not uniform. The intake air has a naturally higher speed in the proximal portion of the intake mouth, i.e. in the part closest to the fan. Inversely, the intake air has a naturally more reduced speed in a distal portion of the mouth, further away from the fan. In the case of an elbowed intake nozzle, the proximal side of the intake mouth is the front side, next to the area of high curvature of the nozzle, and the distal side is the rear side where the curvature is less pronounced. The resultant of the forces of reaction to the entering air flow is thus essentially oriented along the intake axis and is found in the area of the highest speeds, between the proximal portion of the intake mouth and its center.

Within the framework of the invention, the lattice of directional channels mentioned previously has the function of homogenizing the intake air flow and in particular the speed of the intake air, over the entire intake mouth. The lattice of directional channels has the effect of directing the streams of air at each channel in a direction essentially in the axis of the channel. Orientation of the air in an unnatural, privileged direction increases the loss of load in the channels of the proximal portion of the intake mouth. It is able to diminish the air volume and hence the average speed of the air in these channels. Consequently, it also promotes higher air volumes in the distal portion of the intake mouth and hence higher air speeds in the channels of this portion. Homogenizing has thus the main effect of orienting the resultant of the forces of reaction to the displacement of the intake air essentially in the lattice axis while at the same time displacing the point of application of this resultant of the forces from the proximal zone of the intake mouth towards the distal side, i.e. towards the back of the blower. This orientation, together with the displacement of the resultant of the reaction forces has the effect of increasing the leverage of these forces relative to the midpoint of equilibrium of the handle. Homogenizing thus increases the contribution of the intake air flow to the counterbalance of the torque generated by the blowing air flow. For the sake of simplification, in the present description we designate as "force of reaction" to the intake air or to the entering air the resultant of all the streams of air entering into the blower through the intake mouth.

Incidentally, and as mentioned earlier, the axis of the lattice of directional channels presents a point of intersection with the second plane situated upstream of the first plane, i.e. in the back of this plane. This characteristic ensures that the torque generated by the air intake at the point of equilibrium of the handle is always opposite to the torque generated by the blowing action.

It is considered that the lattice of directional channels is placed in the vicinity of the intake mouth when it is located at the end of the intake nozzle forming the intake mouth, or in the intake nozzle downstream of the intake mouth but at a shorter distance from the intake mouth than from the opposite end of the nozzle connected to the blowing fan.

The lattice of directional channels may be formed of a single piece with the protective grid or simply in the vicinity of the protective grid. The lattice of channels may also be used to form the protective grid.

One function of the protective grid is to prevent any objects from being sucked into the intake nozzle. Another function is to prevent an operator from accidentally inserting a hand into the nozzle and reaching the blowing fan in operation.

According to a particular implementation of the lattice of directional channels, the channels can be fitted in a honeycomb pattern. Such a fit is able to optimize homogenizing the intake air speeds while at the same time limit the load loss induced by the lattice. The honeycomb pattern promotes an optimal section of air passage over the entire intake mouth. It minimizes in effect the wall surface between all channels which hinder the passage of air. However, other channel shapes such as channels with a circular, oblong or polygonal section are also practicable.

The lattice of directional channels can be shaped so that the axis of the lattice is parallel to the intake axis and even be one with this axis. This characteristic is however not necessary. It is in fact possible to further improve the counterbalance of the blowing torque by tilting the lattice axis in relation to the intake axis with a divergent component opposite to the fan. In other words, the lattice axis may be tilted so as to confer to the entering air flow a component towards the rear of the blower. In this case, it is primarily the inclination of the lattice axis which confers to the intake air flow its component of direction opposite to the fan.

Such an inclination can possibly reduce the angle between the intake axis and the fan axis. It also makes it possible to increase the displacement towards the rear, i.e. counter to the fan, of the resultant of the forces of reaction generated by the intake air flow.

To improve homogenizing the intake air speeds and amplify the displacement of the resultant of the reaction forces, it is also possible to provide directional channels with a section growing larger respectively on the basis of a distance separating them from the axial fan parallel to the fan axis. The channels are then narrower where the air intake speed tends to be the highest, and wider where the air intake speed tends to be the lowest.

In other words, the section of the channels makes it possible to counterbalance greater or smaller distances traveled by the intake air streams before reaching the fan. The channels with variable section are able to generate variable load losses and to reduce in corresponding fashion the speed of the air stream passing through each channel. In the zone of the intake mouth where the travel of the air streams towards the blowing fan is the shortest, channels with a smaller section are provided in order to put up a certain resistance to the passage of air. In the zone where the travel of the air is longer, the section is greater in order to oppose a less resistance to the passage of air. The progression of the section of the channels may or may not be linear. The variable section of the channels thus makes it possible to further improve homogenizing the air speeds at the intake mouth. In this case it is the progression of the channel section which confers to the intake air flow its component of opposite direction to the fan.

According to another, comparable, possibility, it is also possible to improve homogenizing the air speeds by providing directional channels with a decreasing length respectively on the basis of a distance separating them from the axial fan parallel to the fan axis. With the variable length of the channels a difference of load loss can be created in order to promote higher air speeds in the intake mouth zones receiving air with the longest trajectory up to the fan.

In this case it is the progression of the channel length which confers to the intake air flow a component of direction opposite to the fan.

Preferably the channels present an average length which is above or equal to twice the minimum thickness of a wall separating adjacent channels.

It is also possible to retain a mixing of the various characteristics by providing channels of different length, of different section and different individual orientation. The choice of the measures retained may be dictated by the desire to minimize the overall load loss, or the total resistance opposite to the entering air, by the lattice of directional channels, taking into account the general shape of the blower.

It should be noted that the lattice of directional channels may or may not extend along one plane. A curved shape of the lattice of channels may in particular come with channels the individual orientation of which is not uniform.

As previously indicated, the intake axis forms with the fan axis a non-zero angle, knowing that the intake mouth is turned towards the ground. This angle is preferably between 30 and 120 degrees and even more preferably between 45 and 90 degrees.

Keeping in mind the tilted working position of the blower, such an angle does not only optimize the counterbalance the torsional stress exerted on the midpoint of equilibrium of the handle but also limit the load losses and reduce the air noises during operation of the blower.

In a particular implementation of the blower designed to limit the air noise as much as possible, the lattice axis may be an axis that is essentially orthogonal to the fan axis. It may also form a non-zero angle with this axis that is orthogonal to the fan axis.

The blower may be equipped, besides the lattice of directional channels, with air deflectors arranged in the vicinity of the intake mouth. The deflectors are located upstream of the lattice of directional channels. The deflectors increase the efficiency of the channels and further reduce the air intake noises.

In the construction of the blower it can be advantageous to see to it that the distance between the intake axis and the midpoint of equilibrium of the handle is greater than a distance between the fan axis and the midpoint of equilibrium of the handle.

This measure allows, independently from the lattice of directional channels, to obtain a better counterbalance of the torque at the point of equilibrium of the handle. In effect, since the force of reaction to the intake air flow is weaker than the force of reaction to the blowing air flow, it is possible to partly counterbalance this disparity by means of a stronger leverage for the force of reaction to the intake air flow.

Likewise, the distance between the lattice axis and the midpoint of the handle is preferably greater than a distance between the fan axis and the midpoint of the handle.

According to a further development of the invention, the blowing outlet can be equipped with a blowing mouth with a blowing axis forming an angle with the fan axis, the blowing mouth being turned away from the second plane mentioned previously. In other words, the blowing mouth is bent towards the ground.

The blowing axis is understood to be air axis perpendicular to the mid-plane of the blowing mouth and passing essentially through the middle of the blowing mouth. A mid-plane is considered to the extent that the blowing mouth is not necessarily plane.

The angle between the blowing axis and the fan axis, i.e. the angle of inflection is very low so as not to create a significant load loss in opposition to the exiting air flow. It ranges for example between 5 and 15 degrees.

The force of reaction to the exiting air flow is thus oriented along the blowing axis which in this case no longer coincides with the fan axis. The slight inflection towards the ground of this axis makes it possible to reduce the effective leverage of the force of reaction to the exiting air flow, i.e. of the blowing action, relative to the midpoint of equilibrium of the handle. The torque acting upon the point of equilibrium of the handle, and thereby on the operator's hand, gets reduced or even canceled.

The fan of a blower in accordance the invention may be driven by a thermal engine or an electric motor.

Thus, in a preferred implementation of the blower, the blower may feature an electric motor for driving the fan, and a battery as power supply for the motor, the battery being preferably a remote battery. It is, for example, a battery carried on the back or on the belt and connected to the motor by a power cord. The portable electric blower with remote battery may be configured to generate blowing forces above 10N and even above 5N. In a particular implementation this force is equal to 18 N.

Other characteristics and advantages of the invention become evident in the description below in reference to the figures of the drawings. This description is given for illustrative purposes and is not limiting.

BRIEF DESCRIPTION OF THE FIGURES

The various figures are shown in free scale.

DETAILED DESCRIPTION OF IMPLEMENTATIONS OF THE INVENTION

In the description below identical, equivalent or comparable parts of the various figures are identified by the same reference marks in order to facilitate referring from one figure to another.

Figure 1:
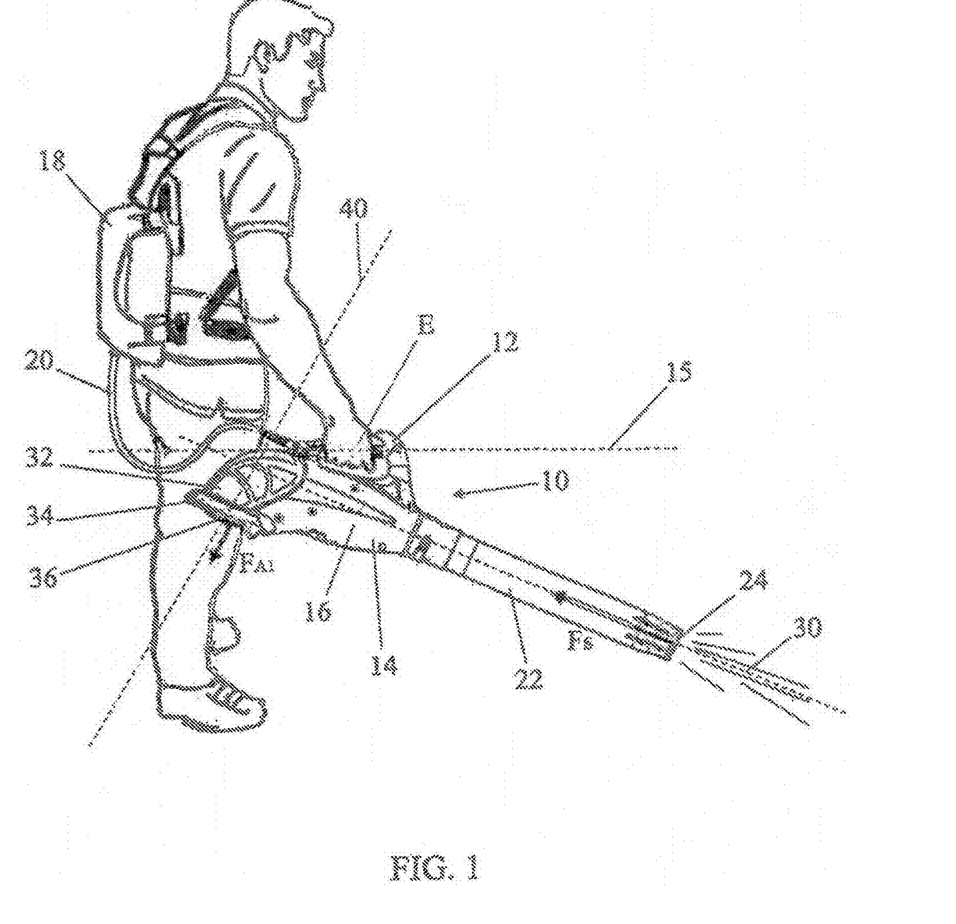
FIG. 1 shows a blower of the known type carried by an operator.

FIG. 1 shows a blower 10 of the type known, and in particular known through the document FR2964987 previously mentioned to which the invention can be advantageously applied. The blower of FIG. 1 presents a large number of characteristics in common with the blower according to the invention and described in reference to the following figures. One can thus refer to FIG. 1 for the common characteristics.

FIG. 1 shows the blower as it is being carried and operated by an operator in a normal position of use for the sweeping of dry leaves. The operator holds the blower by a handle 12 fitted into the upper part of a main casing 14 of the blower.

The main casing 14 essentially contains an axial blower fan 16 for the purpose of creating an air flow. The blower fan is driven by an electric motor and powered by a battery of electric accumulators 18 carried on the back of the operator. A short power cord 20 connects the battery of accumulators to a receptacle located behind the handle.

In the following description, mention of a center of gravity of the blower and various planes or axes of the blower, does not take into account the battery of accumulators 18 nor the power cord 20.

In front of the main casing 14, i.e. downstream of the blower fan, is mounted a blowing outlet 22 the free end of which forms a blower mouth 24, The blowing outlet is centered on a fan axis 30 of the axial blower fan. This axis forms with the ground a non-zero angle in the normal operating position. An axis of the blower mouth coincides here with the fan axis 30.

In the rear of the main casing 14, i.e. upstream of the blower fan, an intake nozzle 32 is connected for sucking in air and directing it to the blower fan. The free end of the suction pipe presents an intake mouth 34 topped by a protective grid 36. The function of the protective grid 36 is to prevent debris or foreign object from being sucked in. The grid also prevents a hand from getting into the pipe so as to avoid any contact with and injury from the blower fan.

One may notice that the intake nozzle 32 is bent. The intake mouth 34 is turned towards the ground when the blower is used in its normal position as shown in FIG. 1. The intake mouth 34 presents an intake axis 40 which forms a non-zero angle with the fan axis 30. On the figure this angle is close to 90°. The intake axis also forms an angle with the ground in the normal operating position. The handle 14 extends in a symmetric plane of the main casing, parallel to the fan axis 30. An axis 15 of the handle 12 is essentially parallel to the ground in the normal operating position of the blower, the blowing outlet being then oriented in a preferential working direction, so as to ensure a natural position of the [operator's] hand.

The handle 12 is furthermore fitted essentially perpendicular to the center of gravity of the blower so as to balance the masses in front of and behind the handle. More precisely, the handle presents a midpoint of equilibrium E, corresponding essentially to the position of the middle finger of the operator's hand as he seizes the handle.

When the blower of FIG. 1 is in operation the air intake through the intake mouth 34 creates a reaction force $F_{A1}$ which is applied essentially in parallel to the intake axis and which is turned towards the ground. In a similar fashion the flow of blown air exiting from the outlet 22 and the blowing mouth 24 creates a reaction force $F_S$ which is essentially applied in parallel to the fan axis and which is turned away from the ground. Thanks to the orientation of the intake mouth 34 towards the ground, the reaction forces $F_{A1}$ and $F_S$ at the air intake and the air exit create at the midpoint of equilibrium E of the handle 12 torque forces which oppose each other.

The intensity of the reaction force $F_S$ at the blowing end is greater than the reaction force $F_{A1}$ at the intake, because of the higher air speed at the exit of the blower. Thus, and in spite of stronger leverage for the reaction force at the intake, the torque resulting from these two forces at the midpoint of equilibrium E of the handle is not zero.

When the blower is not in operation, the center of gravity of the blower is essentially located below and vertical to the midpoint of equilibrium E of the handle. When the blower is in operation, the center of gravity has a tendency to swing in a rotation around the midpoint of equilibrium E towards a new position of equilibrium behind the midpoint. This new position does not necessarily correspond to a desired orientation of the air flow. It therefore requires an effort at the handle and thus at the operator's hand, in order to cancel out the rotation and maintain the blower in the desired direction of air flow.

Figure 2:
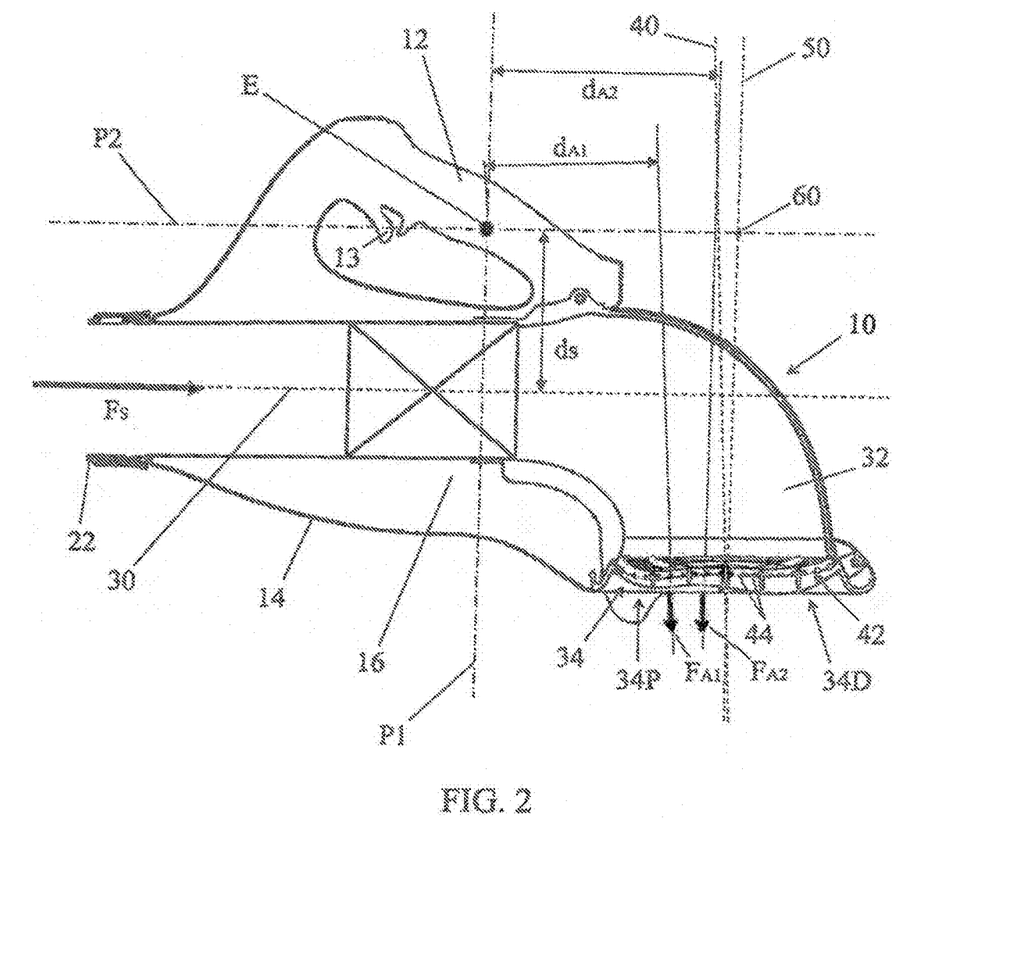
FIG. 2 is a section view of a part of a blower according to the invention.

FIG. 2 shows at a larger scale and in a section view a leaf blower according to the invention. In this figure the blower fan 16 is represented in a summary and symbolic manner so as not to overburden the figure.

One can observe that the intake axis 40 of the intake mouth 34 passes through the middle of the intake mouth and is perpendicular to a mid-plane of the intake mouth. The blower axis of the blowing mouth, not shown, is considered to be one with the fan axis 30.

FIG. 2 also shows the midpoint of equilibrium E of the handle 12, slightly back, Le. "upstream" of an actuating trigger 13 of the blower.

The travel of air from the intake mouth 34 to the blower fan 16 is not uniform in length. In effect, the travel varies between a minimum length for air sucked in within a proximal zone 34P of the intake mouth to and a maximum length for air sucked in within a distal zone 34D of the intake mouth. The terms "proximal" and "distal" are used to signify a distance more or less long up to the entrance of the blowing fan 16. This distance can be considered geometrically relative to the fan axis or linearly by following the curvature of the nozzle 32.

In the absence of a lattice of directional channels, the intake air speed is naturally higher in the proximal zone of the intake mouth than in the distal zone, because of the shorter travel of the air. Thus the forces of reaction at the air intake, or more precisely their resultant $F_{A1}$ over the entire surface of the intake mouth does not apply to the center of the intake mouth. It is offset in the direction of the proximal zone 34P of the intake mouth where the speed of the intake air is higher. This results in reduced effective leverage relative to the midpoint of equilibrium E of the handle 12, represented by the distance $d_{A1}$.

However, and in accordance with the invention, the air intake mouth 34 receives a lattice of directional channels 42 constituted by the juxtaposition of a large number of channels 44. The lattice is characterized by a lattice axis 50 which is determined both by the mid-plane of the lattice and by the average orientation of the channels 44 of the lattice, keeping in mind that the channels are not necessarily all parallel to each other. The lattice axis 50, considered to be at the center of the lattice, presents, relative to the intake axis 40, a divergent component opposite to the blower fan 16. On FIG. 2, the lattice axis 50 passes essentially through the center of the intake mouth, like the intake axis 40, but is tilted towards the rear above the lattice of directional channels 42.

The lattice of directional channels 42 has a function of homogenizing the intake air speeds over the entire intake mouth 34. It reduces in particular the speed gradient or the disparity of the speeds between the proximal zone 34P and the distal zone 34D of the intake mouth 34. The air in each channel is in effect forced to take at the entrance of the channel a preferential direction in the channel axis. When this is not the direction the air would have taken naturally in the absence of a channel, the air meets a resistance at the channel entrance. Its entrance speed, and thus the volume of air in the channel in question are now reduced relative to those in the same section of the intake mouth in the absence of a channel. The volume of air going through the blower is thus distributed towards the channels presenting less resistance to the entrance of air. This has the effect of increasing the volume of air in the channels of the distal zone, and thus the speed of air in these channels. This results in the reaction forces in the channels of the proximal part being reduced, whereas they are increased in the channels of the distal part.

The resultant of the forces of reaction at the air intake thus finds itself displaced in the direction of the center of the intake mouth. It is indicated by a vector $F_{A2}$ on FIG. 2.

Besides homogenizing the air speed, the lattice 42 of directional channels has the effect of orienting an air flow entering parallel to the lattice axis 50. The force of reaction to the intake of air $F_{A2}$, thus also has a tendency of aligning itself along the axis 50 of the lattice.

The torque exerted by the force $F_{A2}$ at the point of equilibrium E of the handle 12 thus benefits from leverage $d_{A2}$ that is superior to the leverage $d_{A1}$ which the reaction force $F_{A1}$ would have in the absence of the lattice of directional channels.

One can observe on FIG. 2 that the intake mouth 34 is located behind the point of equilibrium E. More exactly, the intake mouth 34 is located upstream of a first plane P1 perpendicular to the fan axis 30 and including the point of equilibrium E of the handle. On FIG. 2 the plane P1, also perpendicular to the plane of the figure, is indicated by a broken line of dots and dashes.

Incidentally, the intake mouth is oriented towards the ground. More precisely, it is turned away from a second plane P2 always passing through the midpoint of equilibrium E of the handle 12 and perpendicular to a straight line orthogonal to the fan axis 30, and passing through the midpoint of equilibrium E. On FIG. 2 this straight line coincides with the tracing indicating plane P1, The second plane P2 is also perpendicular to the plane of FIG. 2. It is indicated as a dot-and-dash-line.

Finally, a point of intersection 60 between the lattice axis 50 and the second plane P2 is situated upstream of the first plane P1.

All these measures make it possible to put to good use the torque created by the force of reaction to the intake $F_{A2}$ at the midpoint of equilibrium E of the handle 12, to oppose it to a torque created by the force of reaction to the blowing $F_S$. In the example of FIG. 2., the force of reaction to blowing $F_S$ is applied at the midpoint of equilibrium E of the handle with a leverage $d_S$ inferior to the leverage $d_{A2}$ of the force of reaction to the intake.

When the blower 10 is in operation, the force of reaction to the blowing $F_S$ generates on the handle 12, and in particular in its midpoint of equilibrium E a torque around an axis passing through the point E and constituting the intersection of the planes P1 and P2, i.e. perpendicular to the plane of the figure. The lattice of directional channels allows, in comparison to the blower known as prior art, to significantly improve the counterbalance of the blowing torque and to relieve the counterbalance needed to be exerted by the operator's hand.

Figure 4:
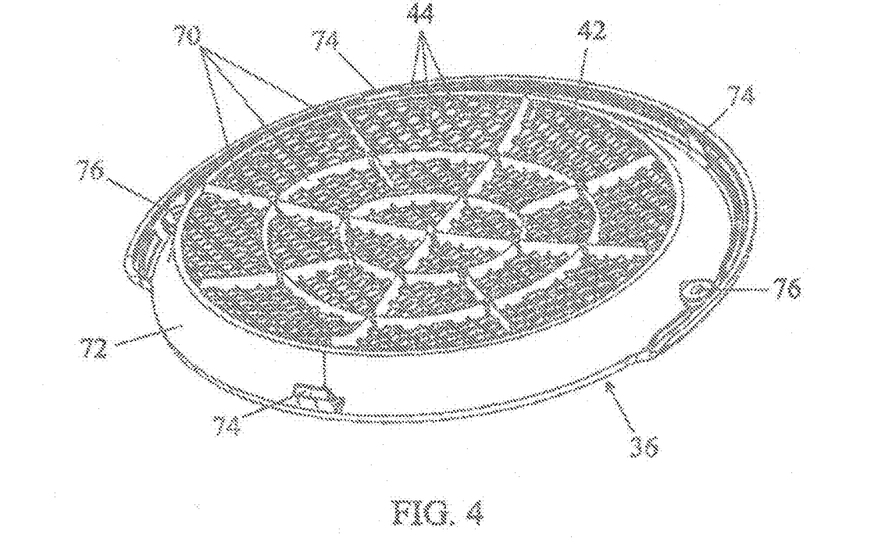
FIG. 4 is a perspective view, seen from downstream, of a lattice of directional channels used in the intake nozzle of FIG. 3.
Figure 5:
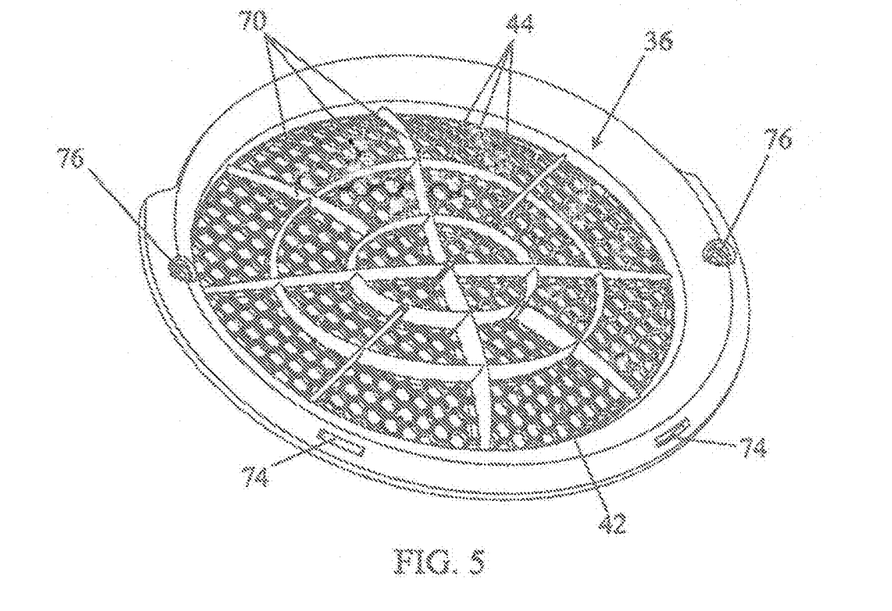
FIG. 5 is a perspective view, seen from upstream, of a lattice of directional channels used in the intake nozzle of FIG. 3.

FIGS. 4 and 5 show a perspective view of the lattice of channels 42 formed of a single piece with the protective grid 36 of the intake mouth. FIG. 4 is a view of the lattice of channels from the downstream side of the air flow whereas FIG. 5 is a view of the lattice from the upstream side of the air flow.

The protective grid 36 is formed by ribs 70 fitted concentrically to a grid center and radially by connecting to a peripheral edge 72 of the grid. The ribs 70 delimit sectors in which are located the channels 44 of the lattice 42 of directional channels. In the example of FIGS. 4 and 5 the channels are all parallel to each other and present a honeycomb section. The flange 72 of the protective grid is provided with lugs 74 and screw passages 76 for its fastening on the air intake mouth, i.e. at the end of the intake nozzle.

FIGS. 4 and 5 show a general elliptical shape of the protective grid 36 and of the lattice of directional channels 42.

Figure 3:
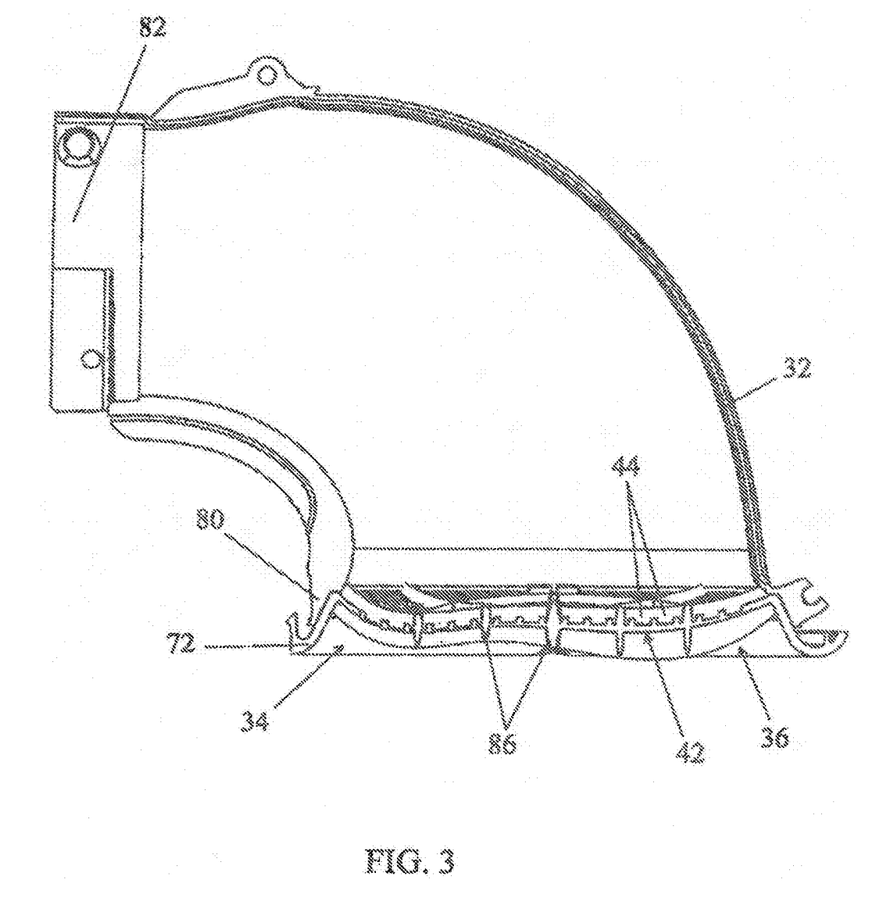
FIG. 3 is a section view at a larger scale of an intake nozzle of a blower according to the invention.

FIG. 3 shows in a section view the fastening of the protective grid 36 and of the lattice of directional channels on the nozzle 32. The flange 72 of the grid comes to bear on a shoulder 80 of the nozzle. A comparable, more or less deep shoulder makes it possible, if necessary, to adjust the depth of the lattice of directional channels 42 in the nozzle 32 downstream of the air intake mouth 34.

The end of the nozzle 32 opposite the intake mouth 34 is provided with a fastening bracket 82 by which the nozzle is attached to the main casing of the blower not shown on FIG. 3.

Figure 6:
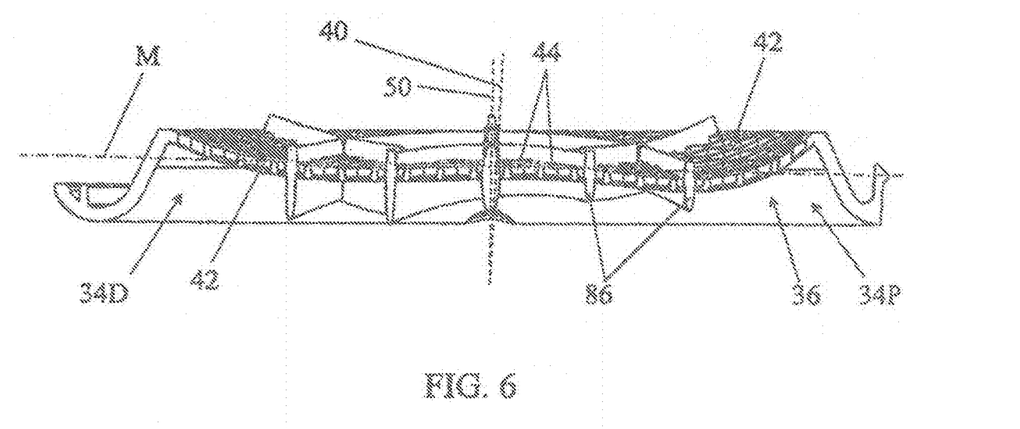
FIG. 6 is a cross-section of the lattice of directional channels along a cross-section parallel to the axis of the lattice and the axis of the fan.

FIG. 6 is a section view of the protective grid at the intake mouth and of the lattice of directional channels 42. It shows that the lattice of channels 42, forming here the grid of the intake mouth, is not plane. One can thus define a mid-plane M of the intake mouth with an intake axis 40 perpendicular to this plane. FIG. 6 also indicates the lattice axis 50 mentioned previously and forming an average axis relative to the axis of each of the channels. It passes through the middle of the lattice and the protective grid. In the example of FIG. 6, the channels are parallel to each other and aligned on the axis of the lattice 50.

Figure 9:
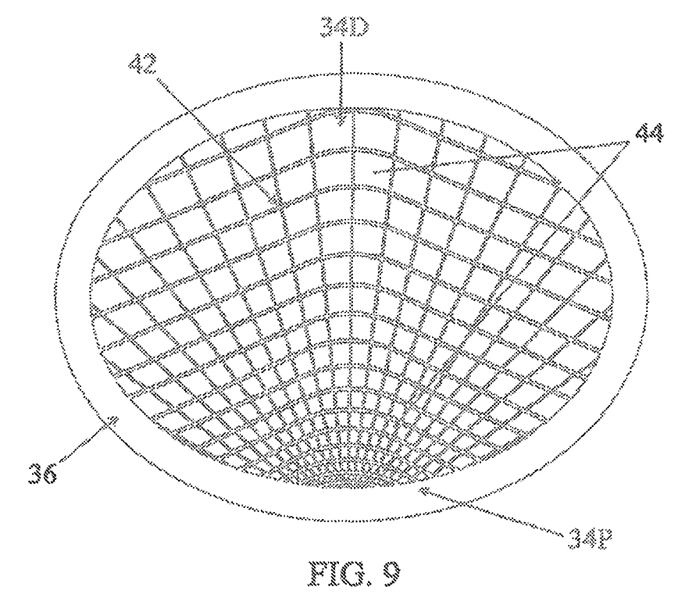
FIG. 9 is a view of another pattern of implementation of the lattice of directional channels in which the section of the channels is increasing from the proximal end to the distal end of the lattice.

FIG. 9 shows an implementation of the lattice of directional channels integrated into the protective grid in which the section of the channels is increasing from the proximal end to the distal end.

FIGS. 3 and 6 also show air deflectors 86 which extend in the vicinity of the intake mouth. The air deflectors 86 are embodied in the protective grid 36 and situated essentially upstream of the lattice of direction channels 42. The function of the air deflectors is to improve laminar air flow and to reduce the air noise.

Figure 7:
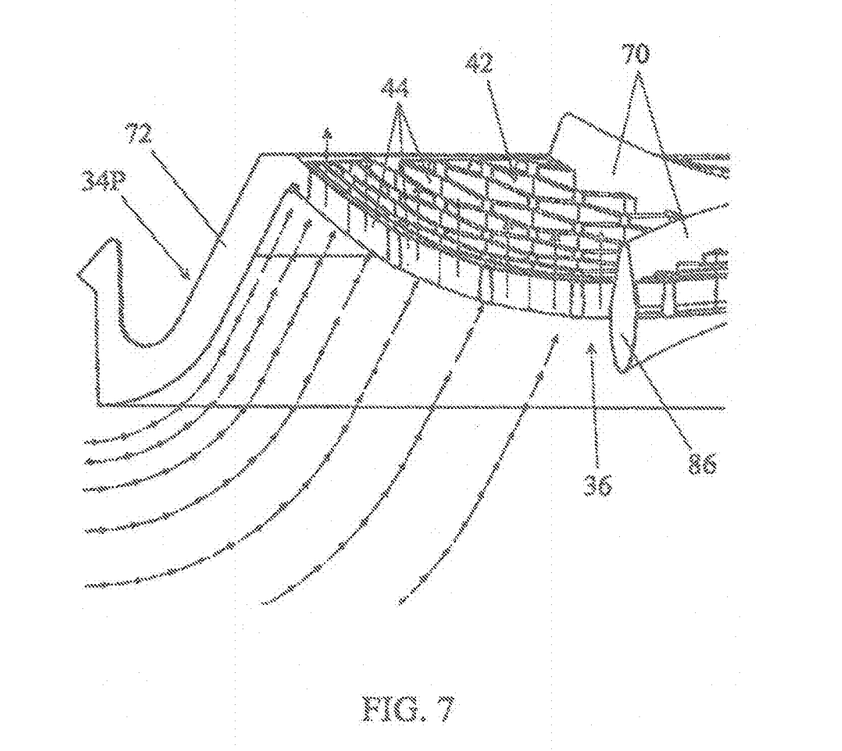
FIG. 7 is a detail at a larger scale of the section shown in FIG. 6.

FIG. 7 shows, at a larger scale, a detail of the protective grid and the lattice of directional channels 42 at the proximal portion 34P. Small arrows indicate the strands of intake air first directed naturally toward the intake mouth 34, then channeled into the channels 44 and oriented parallel to the axis of the lattice. In the example of FIG. 7 the channels are all parallel. It is however possible to envisage producing a lattice of non-parallel channels.

Figure 8:
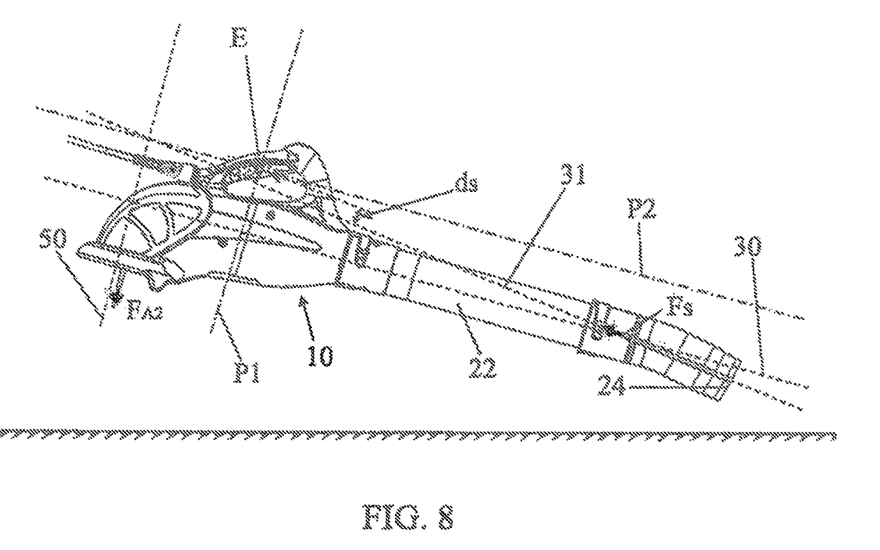
FIG. 8 shows a blower according to the invention with an inflected blower mouth.

FIG. 8 shows a blower in accordance with the invention where the blower outlet 22 presents a blower mouth 24 slightly turned away from the second plane P2 mentioned previously. In other words, the blowing mouth 24, at the end of the outlet 22, is slightly bent downward.

The force of reaction to blowing F thus has a tendency to exert itself along a blowing axis 31 which coincides no longer with the fan axis 30 but which forms with this axis a non-zero angle.

This angle is chosen to be sufficiently small to limit its influence on the efficiency of the blowing action.

However, the distance $d_S$ between the blowing axis 31 and the midpoint of equilibrium E is reduced comparatively to this distance taken for a blowing axis identical to the fan axis. The leverage of the force of reaction to the blowing action and the torque it exerts at the point of equilibrium is also reduced.

The slight tilt of the blowing outlet, combined with the use of a lattice of channels such as described previously makes it possible to considerably reduce if not annul the torque at the handle.

The invention claimed is:

1. Portable leaf blower including:
   an axial blowing fan presenting a fan axis;
   a handle presenting a midpoint of equilibrium;
   a blowing outlet connected downstream of the axial fan;
   at least one intake nozzle connected upstream of the axial fan, the intake nozzle including an air intake mouth with an intake axis forming a non-zero angle with the fan axis, the intake mouth being located upstream of a first plane perpendicular to the fan axis and including the midpoint of equilibrium of the handle, and the air intake mouth being furthermore turned away from a second plane passing through the midpoint of the handle, the second plane being perpendicular to an orthogonal straight line to the fan axis and passing through the midpoint of equilibrium (E) of the handle; and
   a protective grid of the air intake mouth;
   characterized in that:
   the air intake nozzle includes a lattice of directional channels for homogenizing an intake air flow, the lattice of directional channels being fitted in the vicinity of the air intake mouth;
   the lattice of directional channels presents a lattice axis, and the lattice axis presents a point of intersection with the second plane, the point of intersection being located upstream of the first plane; and
   the lattice of directional channels is configured to confer to the intake air flow a directional component opposite to the fan.

2. Blower according to claim 1, in which the lattice of directional channels is formed of a single piece with the protective grid.

3. Blower according to claim 1, in which the lattice of directional channels is formed in the vicinity of the protective grid.

4. Blower according to claim 1, in which the lattice of directional channels constitutes the protective grid.

5. Blower according to claim 1, in which the channels of the lattice of directional channels are fitted in a honeycomb pattern.

6. Blower according to claim 1, in which the lattice axis is parallel to the intake axis.

7. Blower according to claim 1, in which the lattice axis forms with the intake axis an angle with a divergent component opposite to the fan.

8. Blower according to claim 1, in which the channels of the lattice of directional channels present an increasing section respectively depending on a distance separating them from the axial fan.

9. Blower according to claim 1, in which the channels of the lattice of directional channels present a decreasing length respectively depending on a distance separating them from the axial fan.

10. Blower according to claim 1, in which the intake axis forms with the fan axis an angle between 30 and 120 degrees.

11. Blower according to claim 10, in which the angle is between 45 and 90 degrees.

12. Blower according to claim 1, further including air deflectors fitted in the vicinity of the intake mouth upstream of the lattice of directional channels.

13. Blower according to claim 1, in which a distance between the intake axis and the midpoint of equilibrium of the handle is greater than a distance between the fan axis and the midpoint of equilibrium of the handle.

14. Blower according to claim 1, in which a distance between the lattice axis and the midpoint of equilibrium of the handle is greater than a distance between the fan axis and the midpoint of the handle.

15. Blower according to claim 1, in which the channels present an average length greater than or equal to twice the minimum thickness of a wall separating adjacent channels.

16. Blower according to claim 1, in which the blowing outlet presents a blowing mouth with a blowing axis forming a non-zero angle with the fan axis, the blowing mouth being turned away from the second plane.

17. Blower according to claim 16 in which the angle between the blowing axis and the fan axis is between 5 and 15 degrees.

18. Blower according to claim 1, including an electric fan drive motor, and a battery for the electric power supply to the motor, the battery being a remote battery.

* * * * *